(12) United States Patent
Guillet et al.

(10) Patent No.: US 7,345,166 B2
(45) Date of Patent: Mar. 18, 2008

(54) WATER SOLUBLE BIODEGRADABLE POLYMERIC PHOTOCATALYSTS

(76) Inventors: James E. Guillet, University of Toronto, c/o Lash Miller Chemical Laboratories, 80 St. George Street, Room 324, Toronto, Ontario (CA) M5S 1A1; Maria Nowakowska, Faculty of Chemistry, Jagiellonian University, Ingardena 3, 30-060 Krakow (PL)

( * ) Notice: Subject to any disclaimer, the term of this patent is extended or adjusted under 35 U.S.C. 154(b) by 372 days.

(21) Appl. No.: 10/690,847

(22) Filed: Oct. 23, 2003

(65) Prior Publication Data

US 2004/0141740 A1    Jul. 22, 2004

(51) Int. Cl.
   *C07K 14/00*   (2006.01)
   *C08B 3/06*    (2006.01)
   *C08F 16/06*   (2006.01)

(52) U.S. Cl. .................. 536/56; 536/75; 536/102; 536/112; 536/122; 536/123.1; 530/350; 525/56

(58) Field of Classification Search ........... 536/56, 536/75, 102, 112, 122, 123.1; 530/350; 525/56
See application file for complete search history.

(56) References Cited

U.S. PATENT DOCUMENTS

| | | | | |
|---|---|---|---|---|
| 2,980,535 | A | * | 4/1961 | Schroeter et al. ........ 430/270.1 |
| 3,980,765 | A | * | 9/1976 | Broussalian .............. 436/528 |
| 6,077,643 | A | * | 6/2000 | Kumar et al. ............ 430/270.1 |
| 6,293,972 | B1 | * | 9/2001 | Yamaguchi et al. ......... 8/116.1 |
| 6,673,919 | B2 | * | 1/2004 | Yui et al. .................. 536/124 |

OTHER PUBLICATIONS

S. Nagashima et al., "Spectrophotometric Determination of Cyanide with Isonicotinic Acid and Barbituric Acid", Intern. J. Environ. Annal. Chem., 1981, vol. 10, pp. 99-106.

Nowakowska, Maria et al., "Photosensitized degradation of ethyl parathion pesticide in aqueous solution of anthracene modified photoactive dextran", Applied Catalysis B:Environmenal xxx (2004) xxx-xxx, pp. 1-8.

Nowakowska, Maria et al., "Environmentally friendly photosensitizer:starch modified with chlorophyll type chromophores", Manuscript Draft (22 pages w/ letter dated Apr. 4, 2006).

Nowakowska, Maria et al., "Novel water-soluble photosensitizers based on modified dextran", Biomcromolecules, 2004, pp. 1-19.

Nowakowska, Maria et al., "Novel water-soluble photosensitizers from chitosan", Faculty of Chemistry, Jagiellonian University Ingardena 3, 30-060 Krakow, Poland, pp. 1-13 (Paper in preparation for publication).

Nowakowska, Maria et al., "Novel Water-soluble Photosensitizer Based on Starch and Containing Porphyrin", Photochemistry and Photobiology, 2005, 81: 1227-1233.

Nowakowska, Maria et al., "Photosensitized Oxidation of Cyanide in Aqueous Solutions of Photoactive Modified Hydroxyethylcellulose", Journal of Polymers and the Emnvirnoment, vol. 14, No. 1, 1, 2006, pp. 1-14.

* cited by examiner

*Primary Examiner*—Elli Peselev
(74) *Attorney, Agent, or Firm*—Dinesh Agarwal, P.C.

(57) ABSTRACT

Novel antenna polymers characterized by a polymeric background of a biodegradable water soluble polymer and chromophores chemically bonded to the polymeric background have been found to be useful as photocatalysts in aqueous media. On completion of the desired photochemical reaction, the residual medium can safely be discharged to the natural environment as the catalyst residues undergo biodegradation to form environmentally harmless products.

6 Claims, 3 Drawing Sheets

WATER SOLUBLE BIODEGRADABLE POLYMERIC PHOTOCATALYSTS

FIELD OF THE INVENTION

This invention relates to photocatalysts useful in sensitizing various chemical reactions in aqueous solution. More particularly, it relates to processes of conducting such chemical reactions in aqueous solution, including water purification reactions, using photocatalysts which do not leave harmful water-contaminating residues.

Synthetic Aantenna-polymers@, i.e. macromolecules having hydrophobic units which form microdomains in water and contain chromophores and hydrophilic units, are known. In an aqueous medium, the chromophores absorb light in the UV-visible region. Photo energy migration takes place among the chromophores, followed by transfer of the energy to dissolved chemicals in water. That energy can be used to induce photochemical reactions which can purify water containing toxic or otherwise undesirable compounds. An example of a known synthetic antenna polymer is poly(styrene sulfonate—vinyl naphthalene), pSSS-VN, disclosed for use in collection and detoxification of contaminants present in water, on exposure to light in the UV-visible spectral region, natural or artificial.

A potential problem with such uses of synthetic antenna polymers is the nature of their residues and their possible degradation products, and the risk that some of them might prove to be environmentally harmful, water-borne products. When synthetic antenna polymers are used in a closed chemical reaction system, it may be possible, although expensive, to recover the residual catalytic compounds and any degradation products thereof by precipitation, centrifugation or filtration, after the reaction is completed. It is often desirable, however, to be able to release them into natural bodies of water such as lakes, rivers and streams, or even to use them in the purification of a natural body of water. Because their role in the environment could be harmful and difficult to assess, it would be preferable and desirable to provide and use antenna polymers for photocatalytic purposes which are harmless to the environment, and which yield only degradation products which are also similarly harmless.

It is thus an object of the invention to provide novel polymeric materials useful as antenna polymers for photocatalysis in aqueous medium.

It is a further object of the invention to provide a novel process for conducting photocatalytic chemical processes in an aqueous medium.

SUMMARY OF THE INVENTION

The present invention is based upon the discovery that photocatalysts which biodegrade in the natural environment can be made by combining biodegradable water soluble polymers with hydrophobic photoactive groups. The biodegradable water soluble polymers form the base for the catalyst, and the photoactive groups are chemically bonded thereto, in appropriate proportions, so that the photo energy migration among the photoactive groups (chromophores) and subsequent energy transfer to dissolved chemicals in water takes place. On completion of the reaction, the residues can be discharged to the natural environment such as a lake, river or tailings pond, and the catalyst residues undergo biodegradation to form environmentally harmless products.

Thus according to a first aspect of the present invention, there is provided an antenna polymer useful as a photocatalyst in aqueous medium, the polymer comprising a polymeric backbone of a biodegradable water soluble polymer, and photoactive groups chemically bonded to the polymeric backbone.

According to a second aspect of the invention, there is provided a process of conducting photochemical reactions in an aqueous medium, which comprises contacting the component or components of the reaction, in aqueous medium, in the presence of a catalytic amount of an antenna polymer comprising a polymeric backbone of a biodegradable water soluble polymer and photoactive groups chemically bonded to the polymeric backbone, to form a reaction medium, subjecting the reaction medium to UV-visible light to cause photochemical reaction, and, after the photochemical reaction is terminated, exposing the residues of the antenna polymer to an environment where it is susceptible to natural degradation processes. Those natural degradation processes may, but need not involve interaction with light.

BRIEF REFERENCE TO THE DRAWINGS

DESCRIPTION OF THE PREFERRED EMBODIMENTS

Figure 1:
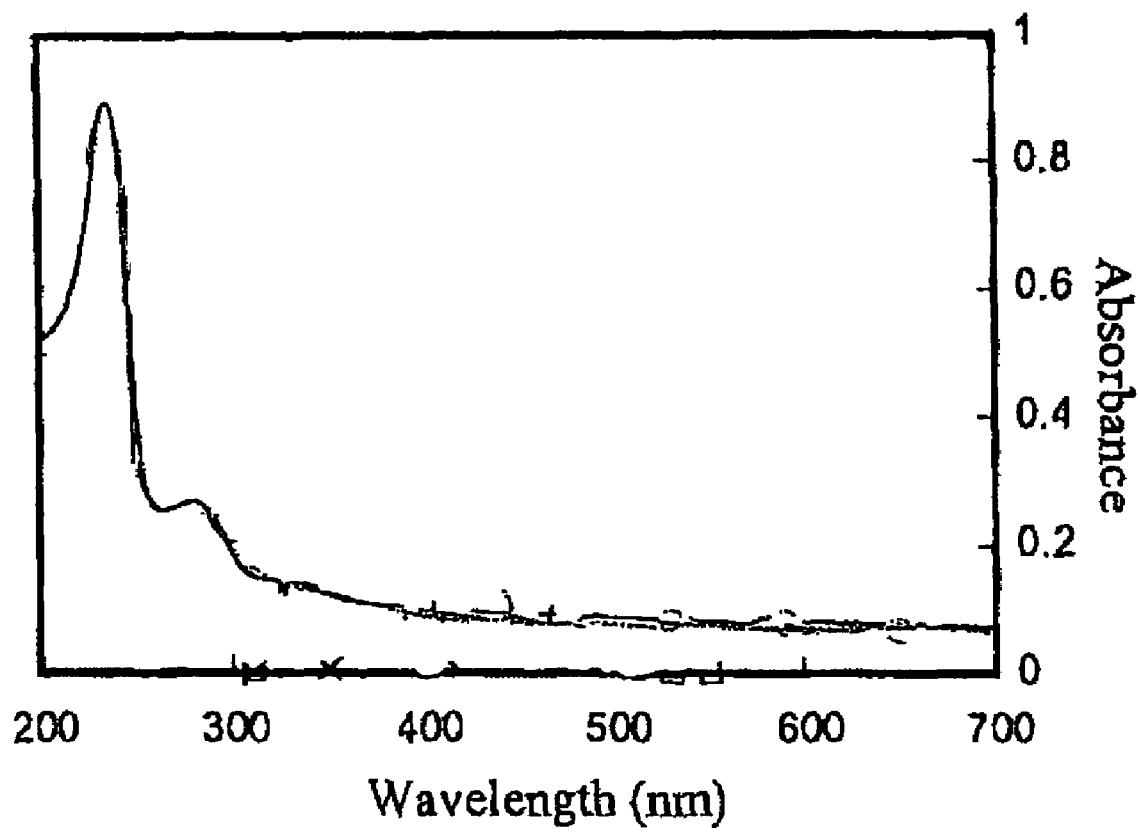
FIG. 1 is the electronic absorption spectrum of the hydroxyethyl naphthyl cellulose (HENC) product of Example 1 below.

Backbone polymers useful in the present invention are preferably water soluble polymers which are known to be biodegradable to environmentally harmless residues, and carry functional chemical groups that can be used for chemical attachment of chromophoric groups. These backbone polymers can be natural products or synthetic products. Suitable preferred products may be found among the polysaccharides, natural or chemically modified, such as starch, hydroxyethylstarch, dextran, hydroxymethyl cellulose, hydroxyethyl cellulose and the like. These products have many hydroxyl groups which can be used for chemical attachment of chromophoric groups, in the necessary numbers. A suitable synthetic polymer for use as the backbone is polyvinyl alcohol, which is known to be biodegradable and which contains hydroxy groups, in large numbers, for derivatization. Other examples include:

Chitosan—a water soluble derivative of chitin (from lobster shells);
Hyaluronic acid;
Amylopectin;
Alginates
Xanthan
Carrageenan All of these alternative backbone polymers are water-soluble derivatives of proteins or sugars and have been used for many years as water-soluble additives, for example, flocculants, thickeners, viscosity promoters and so on. All appear on the GRAS list.

Photoactive, chromophoric groups useful in the preferred process of the invention are those which are known to be photoactive and capable of absorbing photonic energy from UV-visible radiation and eventually transmitting it to chemicals dissolved or suspended in aqueous medium. Many will be known to those familiar with the art. They must be capable of being chemically bonded to the backbone polymer without losing their photoactivity. They may form part of a larger chemical moiety, or be derivatized, so as to be equipped with functional groups to allow chemical attachment to the backbone polymer. Preferred photoactive groups for use in the present invention are aromatic groups, especially polycyclic fused ring aromatic groups such as naphthalene, anthracene, phenanthrene, perylene, and the like. Halogenated forms of these compounds, for example, are available or readily prepared, for coupling to functional groups of the backbone polymer such as hydroxyl groups, to form an antenna polymer in accordance with the invention. Other types and specific examples of chromophoric, photoactive groups which can be used include halogen groups, ketone groups, peroxy groups etc.

Methods of preparing the antenna polymers of the present invention include copolymerization of water soluble polymer-forming monomers with monomers carrying the appropriate chromophoric groups; reaction of low molecular weight photoactive group-containing compounds with preformed water soluble polymers; and grafting the photoactive groups onto the polymer chain of a water soluble polymer. All such methods are well within the skill of the art and do not require detailed discussion herein.

For best results, there should be sufficient photo active groups chemically bonded to the backbone water soluble polymer to allow efficient absorption of photochemical energy and release thereof to effect efficient reaction of the chemical reactants in the aqueous medium. Suitably, the polymer should contain from 1-30 mole % of chromophoric groups, preferably from 3-10 mole %, the optimum amount varying widely according to the choice of polymer, the choice of chromophoric group, the photochemical reaction to be conducted using it and the requirement of water-solubility or dispersability of the resulting catalytic macromolecule.

One specific preferred example of a chemical reaction where antenna polymers of the invention are particularly suitable is the photocatalytic oxidation of cyanides, particularly in treating the effluent of a gold mining operation. Leaching of gold-containing ore with cyanide solution produces tailings having levels of dissolved alkali metal cyanide which are unacceptable for return to the natural environment. Oxidation of the dissolved cyanide to the relatively harmless carbon dioxide and nitrogen oxides can be performed photochemically with air or oxygen as the oxidizing agent, e.g. using catalysts which contain naphthalene groups as the chromophore. The present invention allows this process to be conducted with a degradable catalyst. After the cyanide oxidation process is complete, the reaction medium can be discharged into an open air pond or stream, natural radiation and oxidation accelerates the catalyst residues to environmentally harmless products. Many other specific examples of practical application of the present invention will be apparent to those of skill in the art.

The invention is further described, for illustrative purposes, in the following specific examples, constituting the currently best mode of carrying out the invention.

EXAMPLE 1

Photoactive Modified Hydroxyethylcellulose

Hydroxytheyl cellulose (HEC) is a well-known water-soluble derivative of natural cellulose. A sample of HEC with molecular weight of 155 000 g/mol was purchased from Polysciences, Inc. It was modified by reacting with 2-naphthoyl chloride in dry pyridine. The synthesized product, the naphthyl substituted hydroxytheylcellulose (HENC) is soluble in water. It shows surfactant-like properties, e.g. in the aqueous solution it forms a foam. The electronic absorption spectrum of HENC in aqueous solution (FIG. 1) displays the bands characteristic for the naphthyl (Np) chronophores ($\lambda_{max}$=282 nm and a shoulder around 320 nm). The substitution of the cellulose hydroxyl groups was confirmed by IR and $^1$H NMR spectrospecies. Based on the UV-Vis spectra the degree of substitution (DS) was found to be 2.6 and the number of naphthyl groups per chain is approximately 50. The weight average molecular weight, $M_w$, of HENC (158,000 g/mol) has been determined based on $M_w$, of HEC (155,000 g/mol, dextran standards) and on the degree of substitution.

Due to the content of the Np chromophores, HENC can absorb light from the near UV-Vis spectral region. The excitation spectrum of HENC is in good agreement with its absorption spectrum indicating that there are few interactions between the Np chromophores in the ground state. The emission spectra of HENC measured in organic solvents and in water indicate there is practically no excimer formation. This observation is important for the possible applications of HENC as the photosensitizer because the excimer formation usually lowers considerably the efficiency of polymeric photosensitizers.

EXAMPLE 2

Solubilization of Large Molecules of Hydrophobic Organic Compounds

In order to carry out chemical reactions of hydrophopic organic molecules in water, it is important that the molecule be absorbed by the catalyst, leading to solubilization.

The solubilization was studied using perylene as a molecular probe and measurement of its fluorescence as a method. Such a methodology ensured the highest precision as perylene is very sparingly soluble in water and shows very efficient characteristic fluorescence while solubilized in hydrophobic polymeric microdomains. Perylene (microliter quantities of the solution of the concentration $1\times10^{-3}$ M in acetone) was solubilized in aqueous solution of HENC of the concentration in the range $1\times10^{-3}$-$1\times10^{-1}$ g/L. The solutions were left to equilibrate and the fluorescence spectrum of perylene ($\lambda_{exc}$=415 nm) was measured. It was found that aqueous solution of HENC solubilizes perylene very efficiently. An experiment carried out with anthracene demonstrated the similar effect. The distribution coefficient, K, for anthracene and perylene was calculated to be $2.53\times 10^4$∀5% and $9.25\times10^4$∀5% respectively. The values are quite high, taking into account relatively low content of hydrophobic Np units in the polymer.

EXAMPLE 3

Photocatalytic Oxidation of Cyanides

Figure 2:
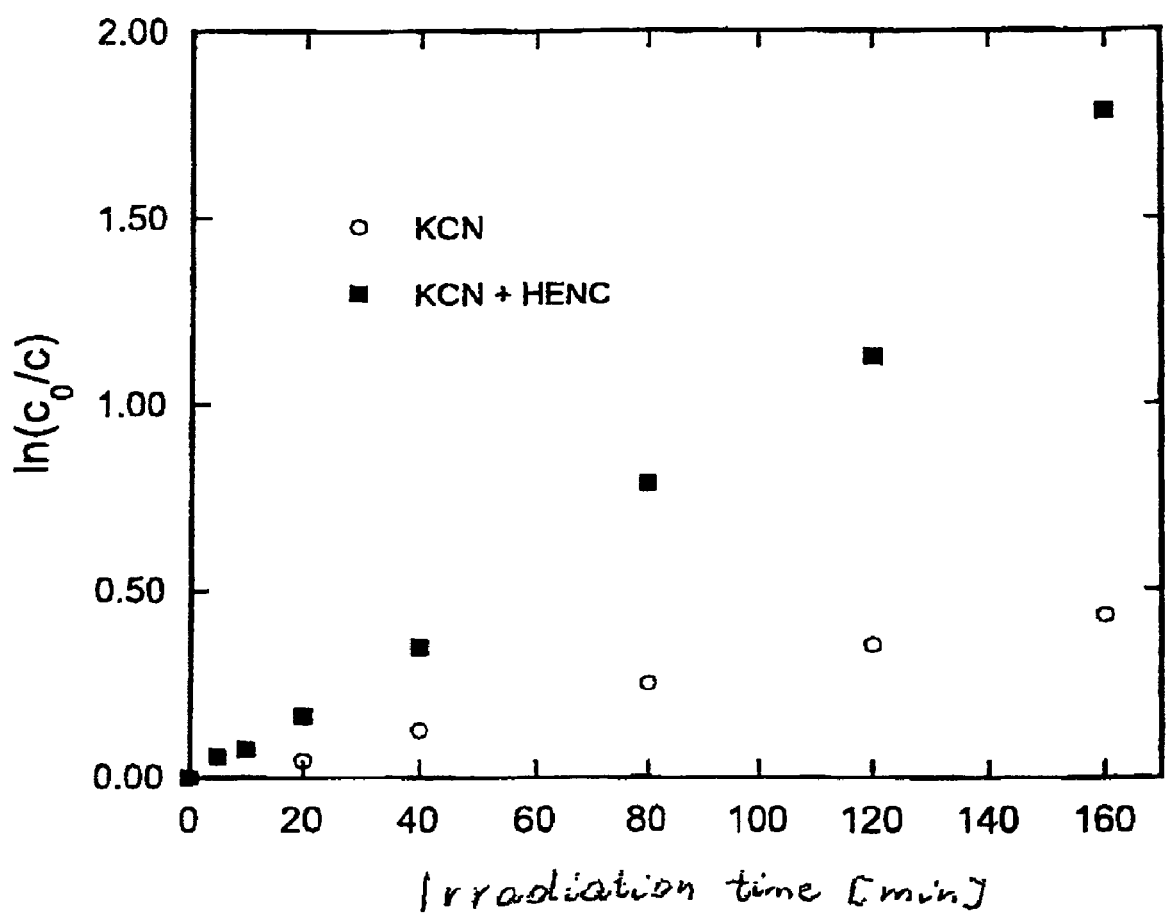
FIG. 2 is a presentation of the reaction kinetics of the process of Example 3 below.

An aqueous solution of HENC (0.8 g/L, pH=8.5) and potassium cyanide (conc.=$5\times10^{-5}$ M/L) was irradiated in an air atmosphere in a Rayonet photochemical reactor (model RPR-100) equipped with 16 lamps giving light with maximum at 300 nm. The oxidation of KCN was monitored using the analytical technique described in literature (Nagashima S. Ozawa T., *Intern. J. Environm., Anal. Chem,* 10 (1981) 99). After 90 min. of irradiation half of KCN present in solution was oxidized. The process was found to be initiated by photoinduced electron transfer and could be described by a pseudo-first order kinetic equation (FIG. 2).

EXAMPLE 4

Photodechlorination of Hexachlorobenzene

Hexachlorobenzene (20 microliters solution in dioxane c=0.01 M) was solubilized in 40 ml of aqueous solution of HENC (conc.=2 g/L). The solution was placed in a quartz tube, bubbled with nitrogen in order to remove oxygen, and irradiated in Rayonet photochemical reactor equipped with 16 lamps (broad band light with the maximum of 300 nm). The reaction was followed by GC measurements. It was found that the step-wise dechlorination of hexachlorobenze occurs in the system with formation of less chlorinated benzenes. After 2 hrs of irradiation 70% of HCB was consumed. Similar results were obtained with the photodestruction of 1,2-dichloroethane.

EXAMPLE 5

Photoactive Modified Dextran

Dextran (Polysciences, $M_W$=15 000-20 000 g/mol) was modified by reacting with 2-naphthoyl chloride in dry pyridine. A water soluble polymer containing naphtalene chromophores was obtained. The procedure of example 3 was repeated using naphthylated dextran as the photocatalyst. After 2 hrs of irradiation about 50% of the KCN present had been photo-oxidized.

EXAMPLE 6

Photoactive Modified Poly(Vinylalcohol)

Poly(vinyl alcohol) (PVA), (Aldrich, 80% hydrolyzed, $M_W$=9 000-10 000 g/mol) was modified by reacting with 2-naphthoyl chloride (Aldrich) in DMSO solution in a presence of pyridine. The resulting polymer was precipitated to butyl alcohol, washed with diethyl ether, dissolved in water and freeze dried. The resulting polymer was to detoxify KCN in water by the procedure of example 3. After 2 hrs of irradiation 75% of KCN had been photo-oxidized.

EXAMPLE 7

Degradation of Hydroxyethyl Naphthyl Cellulose

Figure 3:
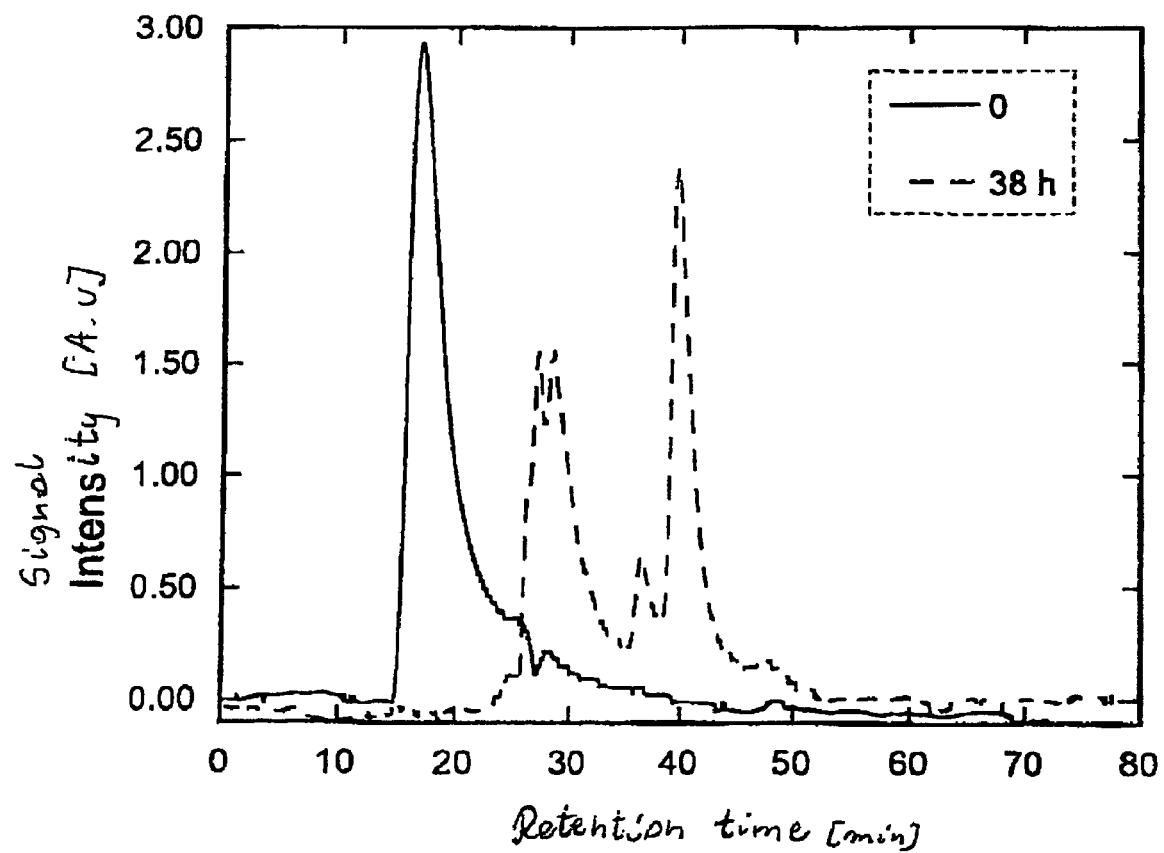
FIG. 3 is a presentation of the gas phase chromatography analysis of the photodegradation of HENC according to Example 7 below.

Aqueous solution of HENC (conc.=0.8 g/L) was placed in a quartz tube and irradiated in a presence of air in Rayonet photochemical reactor with light at $\lambda$=300 nm (broad band with the maximum at 300 nm). The samples were taken periodically and GPC measurements (with the refractive index detector) were carried out. It was found that the polymer undergoes degradation under these conditions (see FIG. 3). The reaction is considerably slower than the phototransformations of the toxic compounds present in the solution so it does not have adhere effect on the photocatalytic activity of HENC.

The invention claimed is:

1. An antenna polymer useful as a photocatalyst in aqueous medium, the polymer consisting essentially of a polymeric backbone of at least one biodegradable water soluble polymer member selected from the group consisting of a natural polysaccharide, a chemically modified polysaccharide, and a water soluble derivate of a protein, and photoactive groups chemically bonded to the polymeric backbone, wherein said photoactive groups are polycyclic fused ring aromatic groups consisting of napthalene.

2. An antenna polymer according to claim 1, wherein said polysaccharide is at least one member selected from the group consisting of starch, hydroxyethyl starch, dextran, hydroxymethyl cellulose and hydroxyethyl cellulose.

3. An antenna polymer according to claim 1, wherein said polysaccharide is at least one member selected from the group consisting of chitosan, hyaluronic acid, amylopectin, alginates, xanthan and carrageenan.

4. An antenna polymer useful as a photocatalyst in aqueous medium, the polymer consisting essentially of a polymeric backbone of biodegradable water soluble polymer which is polyvinyl alcohol, and photoactive groups chemically bonded to polymeric backbone, wherein said photoactive groups are polycyclic fused ring aromatic groups consisting of naphthalene.

5. An antenna polymer according to any one of claims 1, 2 and 3-4, containing from 1 to 30 mole % of photoactive groups.

6. An antenna polymer according to claim 5, containing from 3 to 10 mole % of photoactive groups.

* * * * *